(12) United States Patent
Long et al.

(10) Patent No.: US 11,334,822 B2
(45) Date of Patent: May 17, 2022

(54) PREAUTHORIZATION MANAGEMENT SYSTEM

(71) Applicant: EXPERIAN HEALTH, INC., Franklin, TN (US)

(72) Inventors: Amanda Barrett Long, Boca Raton, FL (US); Shridar Vijay, Morganville, NJ (US); Srinivasamurthy Chillara, Danbury, CT (US); Ramanujam Iyengar, Holmdel, NJ (US); Ciby Panicker Abraham, Wyncote, PA (US); Robert B. Mergner, Sr., Pipersville, PA (US); Jack Bendon, Blakeslee, PA (US); Ramanan Thiagarajah, Collegeville, PA (US); Nikhil K. Oza, Souderton, PA (US); Theresa W. Marshall, Lansdale, PA (US); Renee Rexrode Brehm, Pottstown, PA (US); Joseph M. Magee, III, Drexel Hill, PA (US); Robert Bradley Mergner, Jr., Pipersville, PA (US); Anil George, Chalfont, PA (US)

(73) Assignee: Experian Health, Inc., Franklin, TN (US)

( * ) Notice: Subject to any disclaimer, the term of this patent is extended or adjusted under 35 U.S.C. 154(b) by 523 days.

(21) Appl. No.: 14/529,952

(22) Filed: Oct. 31, 2014

(65) Prior Publication Data

US 2015/0127364 A1 May 7, 2015

Related U.S. Application Data

(60) Provisional application No. 61/898,965, filed on Nov. 1, 2013.

(51) Int. Cl.
| | | |
|---|---|---|
| *G06Q 10/06* | (2012.01) | |
| *G06Q 10/10* | (2012.01) | |
| *G06Q 40/08* | (2012.01) | |

(52) U.S. Cl.
CPC ..... *G06Q 10/063114* (2013.01); *G06Q 10/10* (2013.01); *G06Q 40/08* (2013.01)

(58) Field of Classification Search
CPC .......... G06Q 50/22; G06Q 10/063114; G06Q 40/08; G06Q 10/10; G06Q 50/24; G06F 19/328
See application file for complete search history.

(56) References Cited

U.S. PATENT DOCUMENTS

| | | | |
|---|---|---|---|
| 7,034,691 B1 * | 4/2006 | Rapaport | G06Q 10/10 340/573.1 |
| 7,668,738 B2 * | 2/2010 | Wiggins | G06Q 10/087 705/2 |

(Continued)

*Primary Examiner* — Gregory D. Moseley
(74) *Attorney, Agent, or Firm* — Knobbe, Martens, Olson & Bear, LLP

(57) ABSTRACT

A preauthorization management system. The preauthorization management system allows a health care provider to submit a preauthorization request and track the status of the preauthorization request until a final determination is reached. Once a request has been submitted, the preauthorization management system monitors the status of the request until a final disposition is reached. The preauthorization management system documents the submission and determination process to provide a record that may be used to show an event or outcome occurred. The preauthorization management system offers a simplified and uniform system for managing preauthorization for health care services that reduces or eliminates the need for health care providers to learn diverse systems and procedures of a multitude of health insurance providers.

20 Claims, 6 Drawing Sheets

(56) References Cited

U.S. PATENT DOCUMENTS

| | | | | |
|---|---|---|---|---|
| 8,014,756 B1* | 9/2011 | Henderson | ........... | G06Q 10/103 |
| | | | | 455/411 |
| 8,392,214 B1* | 3/2013 | Pinsonneault | ........ | G06F 19/328 |
| | | | | 235/378 |
| 8,874,476 B1* | 10/2014 | Taylor, III | ............. | G06Q 10/10 |
| | | | | 705/35 |
| 2005/0209885 A1* | 9/2005 | Lamb | ..................... | G06Q 10/10 |
| | | | | 705/2 |
| 2005/0251429 A1* | 11/2005 | Ammer | .................. | G06Q 40/08 |
| | | | | 705/4 |
| 2006/0184397 A1* | 8/2006 | Wester | ................... | G06Q 40/08 |
| | | | | 705/4 |
| 2007/0050219 A1* | 3/2007 | Sohr | ...................... | G06Q 40/08 |
| | | | | 705/4 |
| 2011/0071846 A1* | 3/2011 | Crystal | ................. | G06F 19/328 |
| | | | | 705/2 |
| 2011/0257992 A1* | 10/2011 | Scantland | ............. | G06Q 10/10 |
| | | | | 705/2 |
| 2012/0102101 A1* | 4/2012 | Wenig | ................. | G06F 11/3438 |
| | | | | 709/203 |
| 2013/0191895 A1* | 7/2013 | Magee | ................... | G06F 21/33 |
| | | | | 726/6 |
| 2014/0379361 A1* | 12/2014 | Mahadkar | ............. | G06Q 10/10 |
| | | | | 705/2 |

* cited by examiner

PREAUTHORIZATION MANAGEMENT SYSTEM

CROSS REFERENCE TO RELATED APPLICATION

This application claims priority to U.S. Provisional Application No. 61/898,965, titled "Preauthorization Management System" filed Nov. 1, 2013, which is hereby incorporated by reference in its entirety.

BACKGROUND

Most, if not all, payers of health insurance benefits have rules requiring beneficiaries of a health insurance plan to obtain preauthorization for certain medical services. For example, the payer may require preauthorization for medical services that are deemed expensive, experimental, and/or routinely unnecessary. If preauthorization in not obtained, the payer is not obligated to pay for the medical service. The rules and procedures for obtaining preauthorization are different for each payer and may vary between the different insurance plans offered by a single payer.

Obtaining preauthorization is generally too complicated or burdensome for the patient. Accordingly, health care providers shoulder the responsibility of learning the unique rules and procedures relating to preauthorization for each health insurance plan offered by each payer with whom the health care provider works. All too often, the rules about what medical services require preauthorization and/or the procedures for obtaining preauthorization are not well-documented or readily available to the insured or the health care provider and may change without notice.

The problems associated with preauthorizations faced by health care providers include difficulty in identifying medical services that require preauthorization for different plans and payers, procedural issues relating to submitting requests for preauthorization, and keeping track of pending requests to ensure that preauthorization is obtained. Dealing with these problems adds administrative overhead in the form of additional staff, special procedures, and/or ongoing training, all of which increases expenses of the health care provider. An estimated $31 billion per year is spent dealing with prior authorizations. The consequences of mistakes when preauthorization is required include, for example, claim payments being delayed to claims being denied and unpaid. It is with respect to these and other considerations that the present invention has been made.

BRIEF SUMMARY

Various embodiments of a preauthorization management system allow a health care provider to submit a preauthorization request and track the status of the preauthorization request until a final determination is reached. Once a preauthorization request has been submitted, the preauthorization management system monitors the status of the request until a final disposition is reached. The preauthorization management system documents the submission and determination process to provide a record that may be used to show an event or outcome occurred.

Embodiments of the preauthorization management system include a preauthorization request engine running on a computing device. The preauthorization request engine is in communication with one or more databases including, but not limited to, a payer database, a request database, and a work queue database. Some embodiments of the preauthorization management system include an internal web server running an intermediary web service that accepts web service calls from the preauthorization management engine. When a web service call from the preauthorization management engine is received, the intermediary web service accesses the web content from the payer system and displays it in a web portal viewable through the user agent. In various embodiments, the web content from the payer system is displayed along with supplemental web content provided by the preauthorization management system that offers additional information and/or guidance to the user.

The preauthorization management method executed by the preauthorization management system begins after the preauthorization management system receives an order entered by the health care provider that includes a medical service requiring preauthorization. The preauthorization management system may automatically initiate the preauthorization request submission process for orders requiring preauthorization. Alternatively, the preauthorization request submission process may be manually initiated by the user. The preauthorization management system determines whether the payer system provides electronic status information (e.g., online) or inquiries must be made manually (e.g., by telephone or fax). If the payer system provides electronic status information, the preauthorization management system contacts the payer system to determine if a preauthorization request has been previously submitted to avoid making a duplicate preauthorization request for the patient and the medical service.

If a preauthorization request for the patient and the medical service is not pending, the preauthorization management system determines whether the payer system accepts electronic submissions or submissions must be made manually. If the payer system accepts electronic submissions, the preauthorization management system attempts to automatically submit the preauthorization request to the payer system.

In various embodiments, the preauthorization management system extracts and evaluates the information in the response from the payer system, updates the authorization record associated with the preauthorization request based on the information in the response from the payer system. In various embodiments, the preauthorization management system moves the preauthorization request to the appropriate work queue based on the response from the payer system. The preauthorization management system may also maintain work queues for scheduling automatic status inquiries, which may or may not be directly visible to or accessible by the user in the same manner as other work queues.

Embodiments of the preauthorization management system determine which pending preauthorization requests qualify for automatic inquiries and automatically perform a periodic status inquiry on a selected schedule until a final determination is reached. Because the availability of electronic status inquiry systems may change from time-to-time, the auto-inquiry evaluation operation is a recurring operation.

BRIEF DESCRIPTION OF THE DRAWINGS

Further features, aspects, and advantages of the invention represented by the embodiments described present disclosure will become better understood by reference to the following detailed description, appended claims, and accompanying Figures, wherein elements are not to scale so as to more clearly show the details, wherein like reference numbers indicate like elements throughout the several views, and wherein:

DETAILED DESCRIPTION

A preauthorization management system is described herein and illustrated in the accompanying figures. The preauthorization management system allows a health care provider to submit a preauthorization request and track the status of the preauthorization request until a final determination is reached. Once a request has been submitted, the preauthorization management system monitors the status of the request until a final disposition is reached. The preauthorization management system documents the submission and determination process to provide a record that may be used to show an event or outcome occurred. The preauthorization management system offers a simplified and uniform system for managing preauthorization for health care services that reduces or eliminates the need for health care providers to learn diverse systems and procedures of a multitude of health insurance providers.

Figure 1:
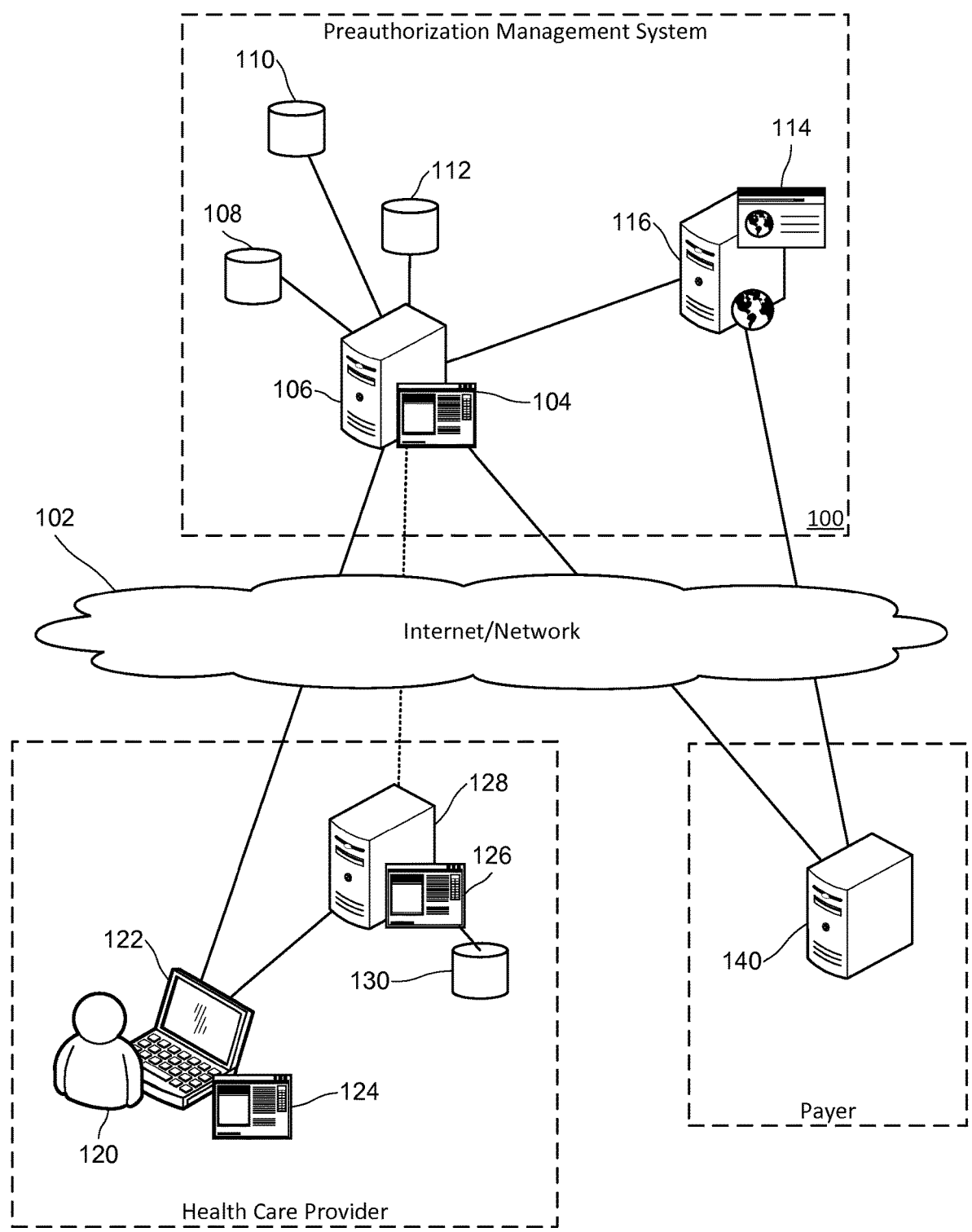
FIG. 1 illustrates one embodiment of the preauthorization management system in a suitable operating environment.

FIG. 1 illustrates one embodiment of the preauthorization management system in a suitable operating environment. The preauthorization management system 100 may be maintained and operated by an intermediary service provider that acts as interface between health care providers and payers to normalize communication solutions, data requirements, and transaction formats. In some embodiments, the preauthorization management system is maintained by the health care provider. The preauthorization management system communicates with a client device 122, the provider information system 126, and/or a payer system 140 over a computer network 102, such as the Internet.

The preauthorization management system 100 includes a preauthorization request engine 104 running on a computing device 106. The preauthorization request engine is in communication with one or more databases including, but not limited to, a payer database 108, a request database 110, and a work queue database 112. While described as separate databases, the data storage of the preauthorization management system may be distributed among multiple databases or consolidated in a single database.

The functionality of the preauthorization management system may be distributed among multiple computing devices or consolidated in a single computing device. In various embodiments, the preauthorization management system utilizes multiple servers with different assigned roles. For example, a highly distributed preauthorization management system may include a front end server (e.g., an application server or web server) that operates as the interface for communications with the health care provider, a database server that manages the data collected by the preauthorization management system, a back end server (e.g., an application server or web server) that interacts with the payer system, and a fax server for sending documents to payers that do not accept electronic preauthorization requests and inquiries.

The payer database may have entries indicating one or more electronic data interchange (EDI) health care transaction formats accepted by the payer and/or universal resource locators (URLs) for EDI transaction or web interface (e.g., web service or web site) endpoints that may be used to electronically query the payer system for the status of a preauthorization request or electronically submit a preauthorization request. The database may also include payer contact information (e.g., a phone number, e-mail address, or mailing address) where a manual inquiry may be made. The request database contains entries relating to information such as, but not limited to, the current status, history, and documentation of preauthorization requests. The work queue database contains groupings of preauthorization requests based on the status of each preauthorization request. The groupings in the work queue database may also be based on additional information evaluated in conjunction with the status of each preauthorization request.

The illustrated embodiment shows a user 120 accessing the preauthorization management system via the client device such as, but not limited to, a general computing device and a mobile computing device (e.g., a smart phone or tablet). The client device is generally capable of running a user agent 124 used to access the preauthorization management system. Examples of suitable user agents include, but are not limited to, a web browser and a preauthorization management system client application. In various embodiments, the user agent compatible with the preauthorization management system is capable of rendering a hypertext markup language (HTML) document.

The health care provider may also maintain a provider information system running on a computing device 128. The provider information system includes a database 130 storing business and patient information used by the health care provider, such as insurance information, electronic medical records, billing information, and appointments. In various embodiments, the provider information system interfaces with the preauthorization management system. In some embodiments, the preauthorization management system may update authorization records stored by the provider information system with information received from the payer system including, but not limited to, transaction identifiers used to track specific pending preauthorization requests and authorization codes indicating approval (or rejection) of a preauthorization request. In some embodiments, the client device accesses the preauthorization management system through the provider information system. In some embodiments, the client device and the provider information system are consolidated into a single computing device.

Various embodiments of the preauthorization management system use a combination of EDI transactions, web services, web forms, and web pages to interactively communicate with the client device, provider information system, and/or the payer system. In some embodiments, the preauthorization management system may use electronic mail or facsimile to send information to the payer on behalf of the user or to the user. Communications (i.e., messages) between the preauthorization management system, client device, provider information system, and the payer system are encrypted or otherwise secured at or above the level required to comply with applicable health care information privacy laws, regulations, and standards. The terms "request" and "response" may be used to generally describe message directionality and should not be construed as requiring any particular communication method or protocol.

EDI transactions are based on a standardized interface using strictly formatted messages representing documents that allows the preauthorization management system and the payer system to exchange and understand information with little to no human intervention. Human intervention in the processing of a received message by either system is typically limited to dealing with error conditions, quality review, and other special situations. Examples of a suitable EDI health care transaction formats include, but are not limited to, HL7, 278, and X12.

Web service transactions are through an interface described in a computer readable format such as the Web Service Definition Language (WSDL) that defines the access point(s), method(s), and other specifications of the web service. The web service uses protocols such as, but not limited to, the Simple Object Access Protocol (SOAP) for communication. The messages sent and received by the web service contain the actions and corresponding information specified in the web service definition. The messages are written using use data formats such as, but not limited to, the Extensible Markup Language (XML) and the Security Assertion Markup Language (SAML). The messages are typically sent over the Internet using transport protocols such as, but not limited to, the Hypertext Transfer Protocol (HTTP), the Hypertext Transfer Protocol Secure (HTTPS), or the Simple Mail Transfer Protocol (SMTP). The web service may be a Representational State Transfer (REST) compliant service with a uniform set of methods or an arbitrary service with an arbitrary set of methods.

In the illustrated embodiment, the preauthorization management system includes an internal web server 114 running an intermediary web service 116 that accepts web service calls from the preauthorization management engine. When a web service call from the preauthorization management engine is received, the intermediary web service accesses the web content from the payer system and displays it in a web portal viewable through the user agent. In various embodiments, the web content from the payer system is displayed along with supplemental web content provided by the preauthorization management system that offers additional information and/or guidance to the user. In some embodiments, the intermediary web service may inject additional logic into to web content from the payer system to provide error checking or form validation. In some embodiments, the intermediary web service may use frames around the web portal to display the supplemental information or guidance to the user. For example, the intermediary web service may guide the user to supply missing data when filling out a preauthorization request form. After the completed form is submitted, the intermediary web service may receive the response from the payer system and perform additional functions such as capturing an image of the web content received in response to the submission. The response and the image are then returned to the preauthorization management system as a response to the web service call. In some embodiments, the intermediary web service may process the response and extract information. In other embodiments, the intermediary web service simply returns the response and response processing is handled by the preauthorization management engine.

The preauthorization management system may be a module or component of a larger health care information system or health care management suite offered by the intermediary service provider providing functionality including, but not limited to, any or all of patient intake, patient record maintenance, insurance eligibility verification, order checking, and claim submission. While user interactions may be described as if directly handled by the preauthorization management system, it should be appreciated that the user interactions may actually be handled by one or more other components of the larger system at different times and the information from those user interactions made available the preauthorization management system. For example, a health care provider may enter patient and insurance information into a patient information module during intake, order information into an order checking module after the physician has seen the patient, and additional information needed to complete a preauthorization request into the preauthorization management system.

Figure 2:
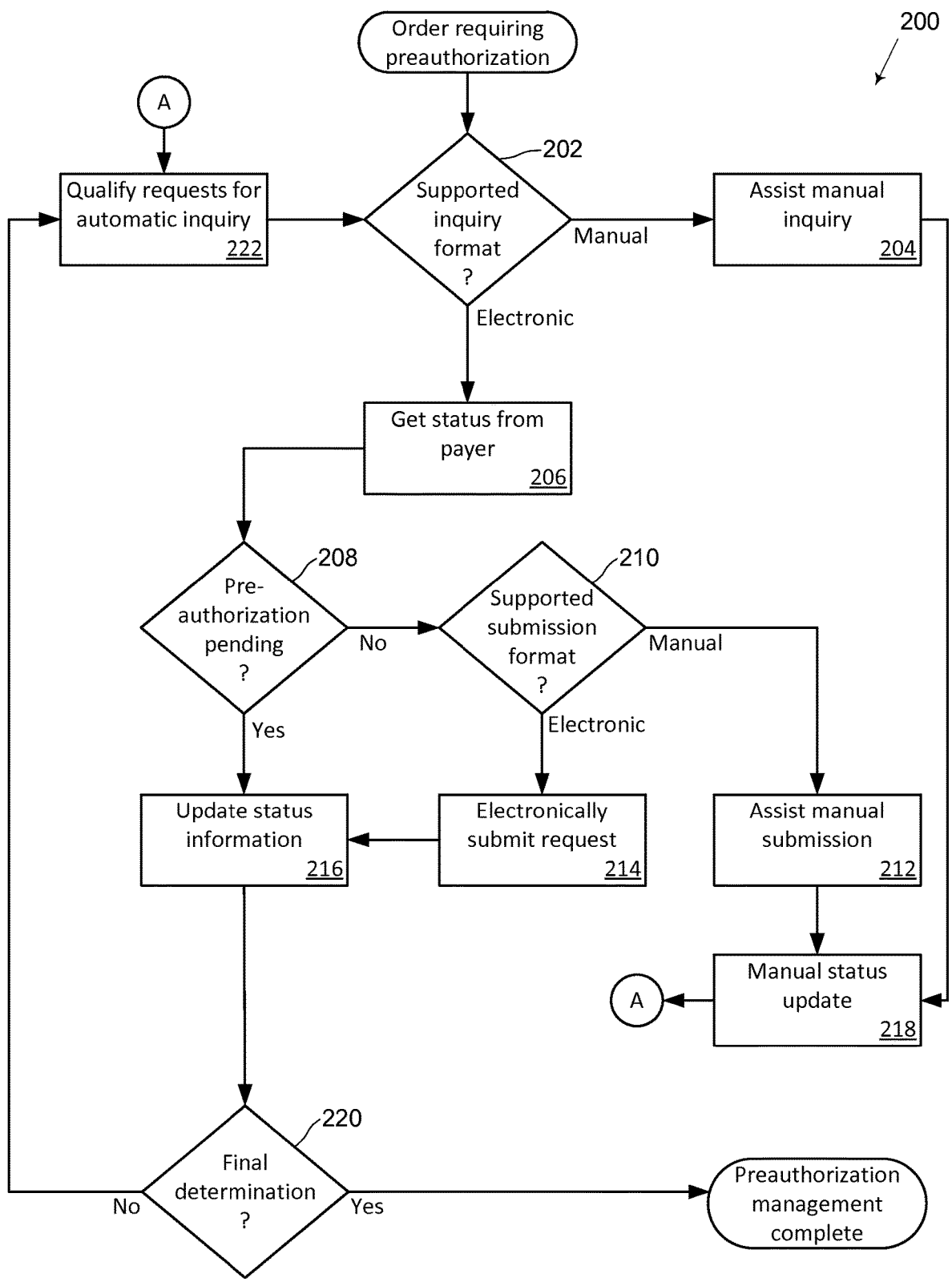
FIG. 2 is a high level flowchart of one embodiment of the method performed by the preauthorization management system.

FIG. 2 is a high level flowchart of one embodiment of the method performed by the preauthorization management system. The preauthorization management method 200 begins after the preauthorization management system receives an order entered by the health care provider that includes a medical service requiring preauthorization. The preauthorization management system may automatically initiate the preauthorization request submission process for orders requiring preauthorization. Alternatively, the preauthorization request submission process may be manually initiated by the user.

In various embodiments, the order information is entered into an electronic form displayed to the user on the client device. In some embodiments, the electronic form is an electronic order form that collects the basic information needed for preprocessing of the order. The basic information may include, but is not limited to, patient information (e.g., name, contact information, and/or Social Security Number), payer information (e.g., payer identifier), insurance information (e.g., plan number and subscriber number), preliminary diagnosis information (e.g., one or more diagnosis codes), information about the medical services ordered (e.g., one or more treatment codes). In some embodiments, the electronic order form collects information needed to make a preauthorization request when the order is placed.

The preauthorization request submission process typically begins with an inquiry format identification operation 202 to determine whether the payer system provides electronic status information (e.g., online) or inquiries must be made manually (e.g., by telephone or fax). If the payer does not accept electronic inquiries, the preauthorization management system may perform a manual inquiry assistance operation 204 offering various types of assistance to the user, such as providing payer contact information, preparing inquiry forms, and faxing inquiry forms to the payer.

If the payer system provides electronic status information, the preauthorization management system executes an electronic status inquiry operation 206 that contacts the payer system to determine if a preauthorization request has been previously submitted to avoid making a duplicate preauthorization request for the patient and the medical service. Because locating an existing preauthorization request may depend upon the amount, types, accuracy, and/or consistency of the information available in the health care provider records, the intermediary records, and the payer records including orders and authorization records, the electronic status inquiry operation attempts to locate preauthorization request status using a variety of techniques and combinations of information.

In various embodiments, the electronic status inquiry operation may begin by attempting to locate the preauthorization request status using a notification or prior authorization identifier to directly obtain information about a specific preauthorization request.

If the preauthorization request status is not found, the electronic status inquiry operation may continue by attempting to locate health information specific to a subscriber or individual patient using information such as, but not limited to, one or more of the subscriber (i.e., enrollee) number in combination with the patient's date of birth, the subscriber number in combination with a partial or complete name, and the patient's first and last names in combination with the patient's date of birth and state. The health information returned by the payer is then parsed (e.g., by keyword searching) to locate information related to the preauthorization request.

If the preauthorization request status is still not found, the electronic status inquiry operation may continue by attempting to locate health information specific to the physician ordering the service (e.g., by the physician's name, tax identifier, license number, or other identifier). The health information returned by the payer is then parsed (e.g., by keyword searching) to locate information related to the preauthorization request. For example, the results may be searched to locate records matching information such as, but not limited to, some or all of the subscriber number, the patient's first name, the patient's last name, and the patient's date of birth.

If the preauthorization request status is continues to be not found, the electronic status inquiry operation may continue by attempting to locate health information for the participating health care provider, which may be a practice, a hospital, or even a regional or national health care system, and may involve a significant number of information returned by the payer. The health information returned by the payer is then parsed (e.g., by keyword searching) to locate information related to the preauthorization request. For example, the results may be searched to locate records matching information such as, but not limited to, some or all of the subscriber number, the physician's name or identifier, the patient's first name, the patient's last name, and the patient's date of birth.

In some cases, the information returned by the payer for searches by patient, physician, or health care provider may include status information that can be parsed directly from the results. In other cases, the health information returned by the payer may only provide a notification or prior authorization identifier requiring the electronic status inquiry operation to conduct an additional search using the notification or prior authorization identifier to retrieve actual status information. In some embodiments, the amount of health information requested when searching by patient, physician, or health care provider may be limited by start and/or end dates for the health care service to reduce the amount of information that must be parsed.

In various embodiments, the electronic status inquiry operation attempts to locate the preauthorization request status in an efficient manner. For example, the sequence of searches described above begins with the most direct searches before moving to more general searches requiring parsing of increasing amounts of information. If the information for a particular search is not available, the electronic status inquiry operation may skip that search and move to the next search for which sufficient information is available. In some embodiments, the search order may vary depending upon the payer. For example, some payers may not provide the capability of conducting certain searches or may not provide useful information in response to certain searches. The electronic status inquiry operation may learn that some searches are unproductive for a payer and adjust the search methodology for that payer.

In a preauthorization check operation 208, the preauthorization management system evaluates the response from the payer system to determine if a preauthorization request for the patient and the medical service is pending.

If a preauthorization request for the patient and the medical service is not pending, a submission format identification operation 210 determines whether the payer system accepts electronic submissions or submissions must be made manually. If the payer does not accept electronic inquiries, the preauthorization management system may perform a manual submission assistance operation 212 offering various types of assistance to the user, such as providing contact information, preparing manual submission forms, and faxing submission forms to the payer. In some embodiments, the submission format is determined at the same time the inquiry format is determined. If the payer system accepts electronic submissions, the preauthorization management system executes an electronic preauthorization request submission operation 214 attempts to automatically submit the preauthorization request to the payer system.

A status update operation 216 extracts and evaluates the information in the response from the payer system and updates the authorization record associated with the preauthorization request based on the information in the response from the payer system. In various embodiments, the status information received in response to the preauthorization request submission is a receipt confirmation that includes a unique transaction identifier or other information that may be used to identify and verify the transaction. In some embodiments, some or all of the information obtained from the payer system is used to populate the corresponding fields in the preauthorization request form viewable by the user. The preauthorization management system may optionally update the records of any connected systems (e.g., the provider information system) with the status information. Evaluation of the response may be as simple determining whether or not the payer system returns an authorization number for the preauthorization request. In some embodiments, the response is parsed for keywords (e.g., approved, certified, error, pending, denied, or rejected).

In various embodiments, the preauthorization management system moves the preauthorization request to the appropriate work queue based on the response from the payer system. In various embodiments, the work queues may be based on the basic status. For example, preauthorization requests may be placed in status-based work queues (e.g., approved, rejected, or pending). If an attempted submission was accepted, the preauthorization request may be placed in a queue showing recently filed or pending preauthorization requests. If an attempted submission was rejected due to missing information or errors, the preauthorization request may be placed in a queue showing preauthorization requests requiring the user to correct or supply additional information. In some embodiments, preauthorization requests may be placed in multiple work queues providing the user with additional information. For example, separate status-based work queues may be created for each payer or for specific medical services (or classes thereof)

allowing the user to see patterns (e.g., payers or medical services with atypical rejection rates).

In various embodiments, the status update operation looks at additional information such as, but not limited to, the date of a scheduled appointment associated with the preauthorization request and the availability of the payer system when determining the appropriate work queue. For example, if status information was not returned by the payer system and the payer system was available, the preauthorization request may be placed in a queue showing preauthorization requests without current status information. If status information was not returned by the payer system and the payer system was unavailable, the preauthorization request may be placed in a queue showing preauthorization requests to be rechecked when the payer system becomes available. If the patient has a scheduled appointment for the medical service within a selected amount of time and approval has not been obtained, the preauthorization request may be placed in a work queue for medical services at risk of not being paid due to lack of preauthorization. This allows appointments to be rescheduled and resources (e.g., operating rooms) to be released and avoid incurring medical fees that may go unreimbursed by the payer and/or the patient. In the case of a rejection, the preauthorization request may be placed in a work queue showing preauthorization requests where an appeal may be filed. These examples of work queue management are intended to illustrate the variety and types of work queues that may be available and should not be construed as limiting the preauthorization management system.

The preauthorization management system may also maintain work queues for scheduling automatic status inquiries, which may or may not be directly visible to or accessible by the user in the same manner as other work queues. Preauthorization requests may be automatically placed in an inquiry schedule work queue automatically based on a schedule agreed upon between the health care provider and the intermediary or the time before a scheduled appointment. The user may also choose to manually add, move, or delete a particular automatic inquiry without altering the remaining schedule. Inquiry schedule work queues may also be broken down by payer or by payer and plan allowing a single supported inquiry format check to be performed for each group rather than for each preauthorization request.

The preauthorization management system may use intelligent scheduling of the automatic status inquiries based on criteria such as, but not limited to, the date of service. In one embodiment, the automatic status inquiry is scheduled to run every 24 hours when the date of service was between three and six days ago, every 12 hours when the date of service was the day before to three days ago, every 8 hours when the date of service is today within the next seven days (including the current date), every 24 hours when the date of service is between eight and 14 days away, every 72 hours when the date of service is more than 14 days away, and never when the date of service was more than six days ago.

In the case of a manual inquiry assistance operation and the manual submission assistance operation, a manual status update operation 218 allows the user to update the status of preauthorization request in the payment management system, place the preauthorization request in the appropriate work queue, and, optionally, any connected systems (e.g., the provider information system), based on the status information manually entered by the user.

A final determination operation 220 determines if the status of the preauthorization request reported by the payer system or manually entered by the user corresponds to a final determination (e.g., approval or rejection). If the preauthorization request has been approved, no further action is generally necessary and preauthorization management is considered complete. If the preauthorization request has been rejected, preauthorization management is considered complete in the sense that the preauthorization request does not require further monitoring unless the user initiates a subsequent action such as, but not limited to filing an appeal of the rejection.

The preauthorization management system automatically monitors pending (i.e., without a final determination) preauthorization requests until a final determination has been reached through a recurring status inquiry operation 222 determines which pending preauthorization requests qualify for automatic inquiries and automatically performs a periodic status inquiry on a selected schedule until a final determination is reached. In one embodiment, an auto-inquiry evaluation operation determines whether automatic inquiry is available for a preauthorization request in the preauthorization management system. In various embodiments, the automatic preauthorization request monitoring operation involves checking to see the payer provides electronic status information in a computer readable format. In some embodiments, the preauthorization management system checks the payer, the plan, and/or other identifying information associated with the preauthorization request against a database storing the available communication methods supported by the payer. For example, the database may have entries indicating one or more EDI health care transaction formats accepted by the payer or universal resource locators (URLs) for web services or forms that may be used to query the payer system for the status of a preauthorization request.

Because the availability of electronic status inquiry systems may change from time-to-time, the auto-inquiry evaluation operation is a recurring operation. For example, the payer may implement an online inquiry system or a script to scrape and parse the status web page generated by submission of inquiry web form may be created and added to the preauthorization management after the preauthorization request was filed. Conversely, a previously accessible electronic status inquiry system may become inaccessible should the payer might change to an EDI health care transaction format not supported by the preauthorization management system or alter the status web page in manner that breaks the screen scraping script used by the preauthorization management system. In various embodiments, the preauthorization management system performs the auto-inquiry evaluation operation as each preauthorization request comes up for a scheduled inquiry. In some embodiments, the auto-inquiry evaluation operation occurs as a batch operation on some or all of the preauthorization requests being handled by the preauthorization management system independently of the inquiry schedules (if any) for the individual preauthorization requests.

If electronic status inquiry is not available, no further processing for that preauthorization request is necessary at that time, but, as discussed above, the preauthorization management system will recheck the availability of electronic status information at a later time. Otherwise, the auto-inquiry evaluation operation may perform additional activities or pass control to a subsequent operation. In some embodiments, if electronic status information becomes available for a preauthorization request without a recurring status inquiry schedule, the preauthorization request may be flagged to have a recurring status inquiry schedule applied. Alternatively, a recurring status inquiry schedule based on a default schedule or a preset schedule agreed on by the health care provider and the preauthorization management service provider.

Figure 3:
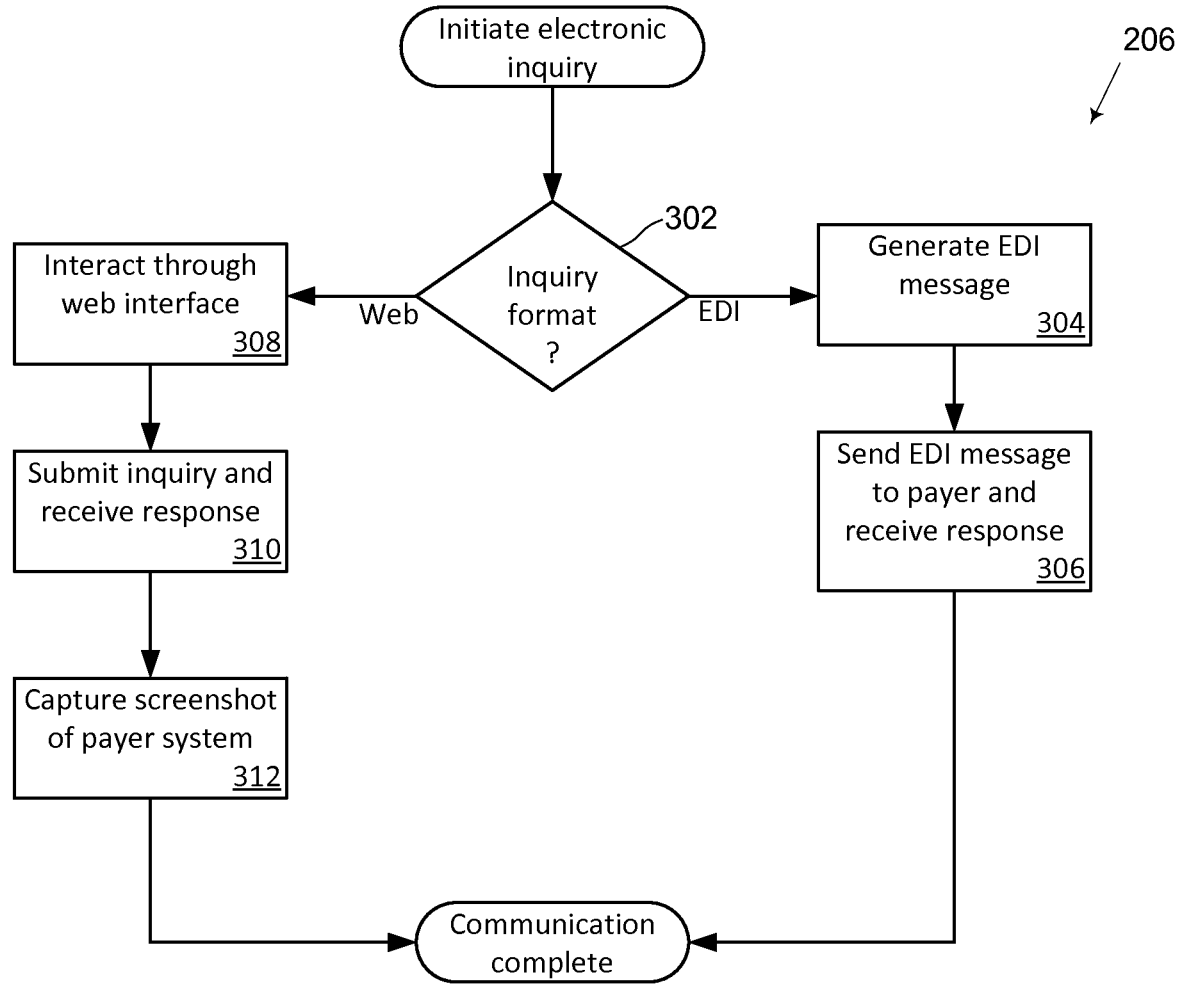
FIG. 3 illustrates one embodiment of the electronic preauthorization status inquiry component of the preauthorization management method.

FIG. 3 illustrates one embodiment of the electronic status inquiry operation automatically initiated by the preauthorization management system or manually initiated by the user. Generally, the electronic status inquiry operation begins with a supported inquiry format determination operation 302 in which the preauthorization management system identifies whether the payer accepts electronic status inquiries and, if so, the manner in which the electronic status inquiry is made. In various embodiments, the preauthorization management system checks the payer, the plan, and/or other identifying information associated with the preauthorization request against the available communication methods supported by the payer (e.g., against the payer information database).

If the payer system uses EDI for health care transactions, the preauthorization request generation operation 304 generates a message using the EDI health care transaction format understood by the payer system. The EDI inquiry communication operation 306 sends the EDI message to the payer system and receives the EDI response.

Otherwise the preauthorization management system performs a web interface operation 308 that accesses the web interface of the payer system to make the status inquiry. In various embodiments, the payer system exposes a defined web service for consumption by the preauthorization management system. In other embodiments, the preauthorization management system interacts with web-based forms and result pages served by the payer system. In such case, the preauthorization management system may execute one or more scripts that populate the fields of and submit a web form to the payer system.

The web interface communication operation 310 submits the inquiry to the payer system and receives the response. In various embodiments, the response is a message corresponding to a defined web service. In other embodiments, the response is a web page, and the preauthorization management system may execute scripts that use screen scraping or other techniques to capture and parse results information from the web page generated in response to the submitted web form. An inquiry screen capture operation 312 captures an image of the web page returned by the payer system. The screen capture is associated with the preauthorization request and stored in the preauthorization database.

Figure 4:
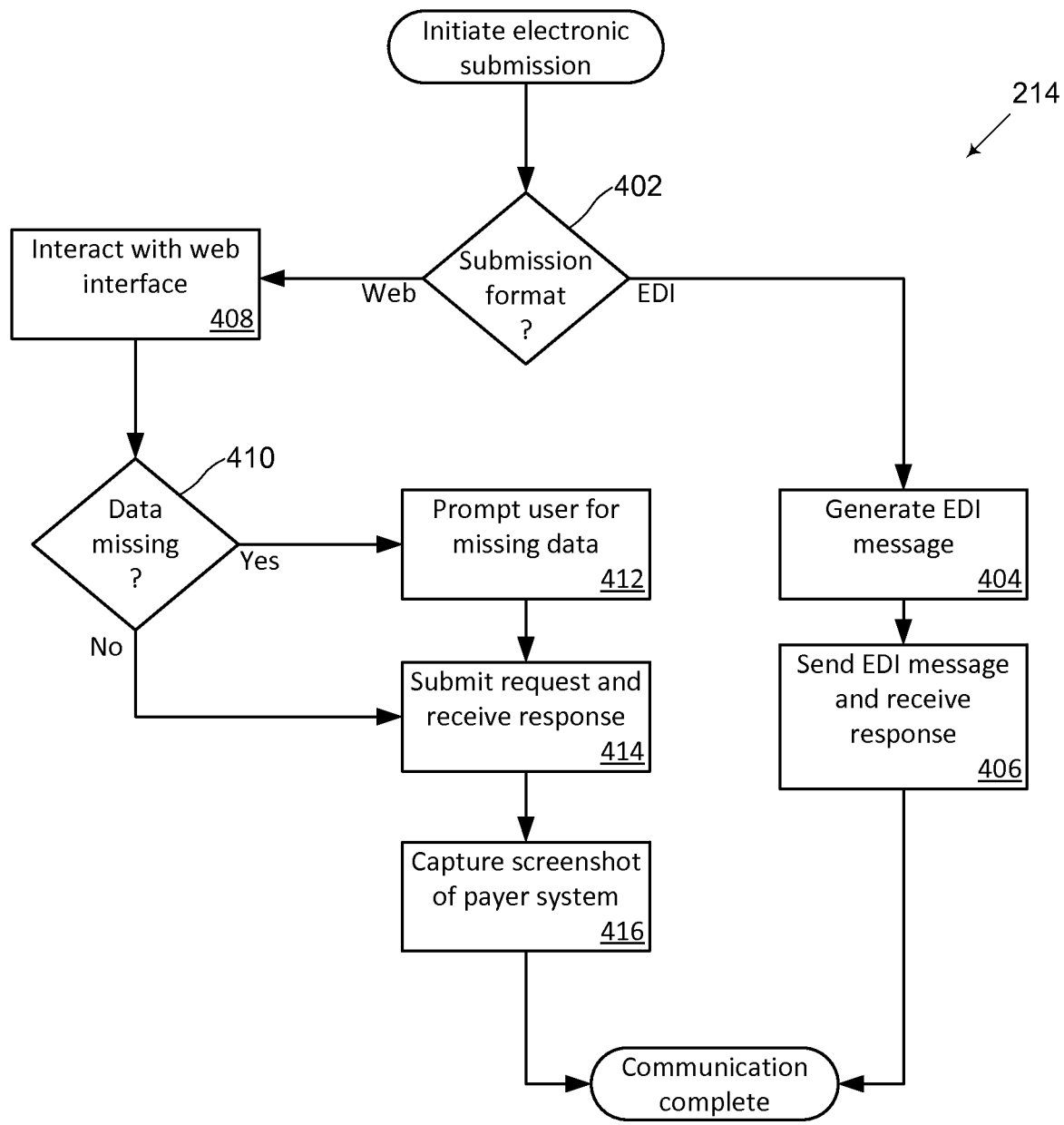
FIG. 4 illustrates one embodiment of the electronic preauthorization request submission component of the preauthorization management method.

FIG. 4 illustrates one embodiment of the electronic preauthorization request submission operation automatically initiated by the preauthorization management system or manually initiated by the user. In general, the electronic preauthorization request submission operation is similar to the electronic inquiry submission operation. The electronic preauthorization request submission operation begins with a supported submission format determination operation 402 in which the preauthorization management system identifies whether the payer accepts electronic preauthorization requests and, if so, the manner in which the electronic submission is made. In various embodiments, the preauthorization management system checks the payer, the plan, and/or other identifying information associated with the preauthorization request against the available communication methods supported by the payer (e.g., against the payer information database).

If the payer system uses EDI for health care transactions, the preauthorization request generation operation 404 generates a message using the EDI health care transaction format understood by the payer system. The EDI inquiry communication operation 406 sends the EDI message to the payer system and receives the EDI response. When submitting a preauthorization request via EDI, the content of the preauthorization request message is well defined. In other words, the preauthorization management system knows what information must be included in a properly formatted EDI preauthorization request message. This allows the preauthorization management system to collect the information needed for EDI preauthorization request message at the time the order is entered or at any time before sending the EDI preauthorization request message to the payer system.

Otherwise the preauthorization management system performs a web interface interaction operation 408 that accesses the web interface of the payer system to prepare the preauthorization request. In various embodiments, the payer system exposes a defined web service for consumption by the preauthorization management system. In other embodiments, the preauthorization management system interacts with web-based forms and result pages served by the payer system. In such case, the preauthorization management system may execute one or more scripts that populate the fields of the web form.

In various embodiments, the preauthorization management system opens the payer web site in a web portal. The preauthorization management system then guides the user in filling out the web-based form. In various embodiments, the preauthorization management system pre-populates the web form using data previously supplied by user. For example, data may be obtained when the order was submitted to the preauthorization management system or through other interactions. In some embodiments, the preauthorization management system may employ a script to populate the web form.

Embodiments the preauthorization management system may perform a request validation operation 410 that determines whether the request is incomplete or contains errors (e.g., invalid dates, patient identifiers, or plan identifiers). Missing data may be identified where the preauthorization management system does not have data for a corresponding field on the payer web form. Missing data may also be identified by parsing the payer web form to identify blank fields and/or from warning or error messages generated by the payer system.

During a request completion operation 412, the preauthorization management system prompts the user to enter missing data. This allows the preauthorization management system to offer guidance to the user when the payer system requires more information than is normally included in the order or otherwise stored by the preauthorization management system. Guidance may be displayed to a user through various techniques including, but not limited to, in-user agent (e.g., in-browser) messages or content in frames around the web portal.

Various embodiments of the preauthorization management system capture the questions asked (e.g., the form) and the answers provided during the preauthorization request submission process for use in further automating the preauthorization request submission process in the future for some or all users of the preauthorization management system and/or a specific user. The questions and answers may be parsed (e.g., by keyword searching) to locate information that can be automatically provided in the future. For example, the order may specify CPT® codes while the payer form may require ICD-9 codes. By analyzing the captured questions and answers, the preauthorization management system can learn that the health care provider had to engage in redundancy by providing ICD-9 codes in addition to the CPT® codes already provided. Knowing this, the preauthorization management system can automatically convert the CPT® codes provided in the order to ICD-9 codes and prepopulate the form for future submissions to the payer.

The web interface communication operation 414 submits the completed request to the payer system and receives the response. In various embodiments, the response is a message corresponding to a defined web service. In other embodiments, the response is a web page, and the preauthorization management system may execute scripts that use screen scraping or other techniques to capture and parse results information from the web page generated in response to the submitted web form. A submission screen capture operation 416 captures an image of the web page returned by the payer system. The screen capture is associated with the preauthorization request and stored in the preauthorization database.

Figure 5:
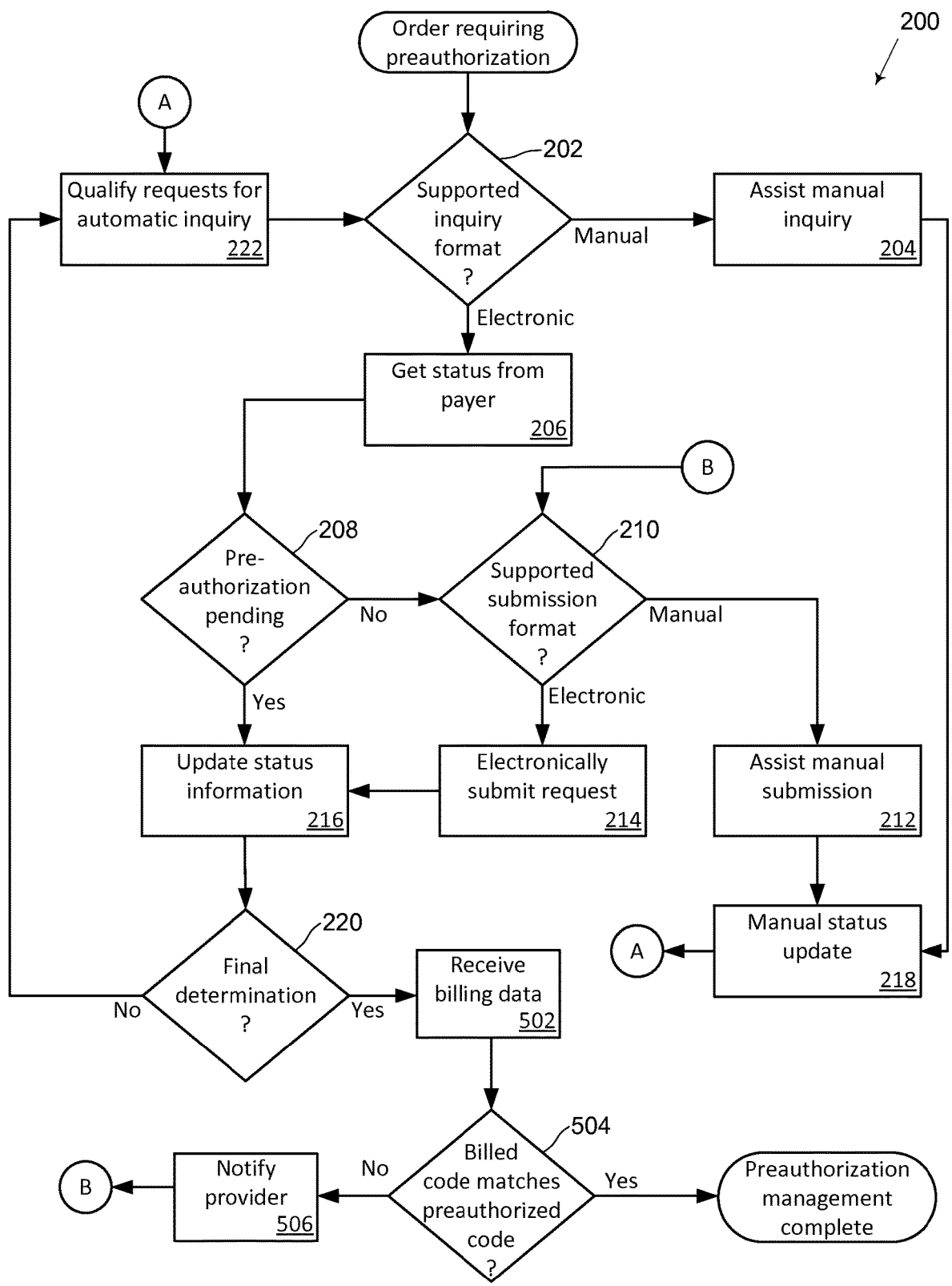
FIG. 5 is a high level flowchart of an alternate embodiment of the preauthorization management method including preauthorization reconciliation.

FIG. 5 is a high level flowchart of an alternate embodiment of the preauthorization management method including preauthorization reconciliation. Preauthorization reconciliation occurs following the service data receipt operation 502 where the preauthorization management system receives service data from a third party such as, but not limited to, the health care provider or the payer. The service data may be obtained from a reporting of procedures performed by the health care provider such as, but not limited to, submitted claims and periodic dumps of performed services (e.g., a daily upload of all procedure codes entered into the health care provider information system).

The preauthorization reconciliation operation 504 processes the service data to identify services actually performed that are inconsistent with the services for which preauthorization was obtained. For example, the procedure codes for the services provided to a patient are compared to the procedure codes submitted in a preauthorization request submitted for that patient. In some embodiments, the preauthorization reconciliation operation only processes services for which a preauthorization request is pending or has been approved. The preauthorization reconciliation operation may utilize the order and authorization records maintained by the preauthorization management system and/or the health care provider information system. In some embodiments, the preauthorization reconciliation operation performs status inquiries against the payer system at this time. In some embodiments, the preauthorization reconciliation operation may also identify services actually performed for which preauthorization has not been obtained.

If the services provided are the same services for which a preauthorization request is pending or has been approved, no action is necessary at this time and preauthorization management is considered complete.

If the services provided are not the same services for which preauthorization has been requested or approved, a notify operation 506 alerts the health care provider that the preauthorization request may require amendment or resubmission to reduce the likelihood that the payer will deny a claim for the services provided. In some embodiments, the notify operation places the preauthorization request in a work queue for preauthorization requests that require review and rework. After review or rework, the reworked preauthorization request or a new preauthorization request may be submitted using the preauthorization management system.

Embodiments of the invention may be implemented via local and remote computing and data storage systems. Such memory storage and processing units may be implemented in a computing device, such as computing device 600 of FIG. 6. Any suitable combination of hardware, software, or firmware may be used to implement the memory storage and processing unit. For example, the memory storage and processing unit may be implemented with computing device 600 or any other computing devices 618, in combination with computing device 600, wherein functionality may be brought together over a network in a distributed computing environment, for example, an intranet or the Internet, to perform the functions as described herein. Such systems, devices, and processors (as described herein) are examples and other systems, devices, and processors may comprise the aforementioned memory storage and processing unit, consistent with embodiments of the invention.

Figure 6:
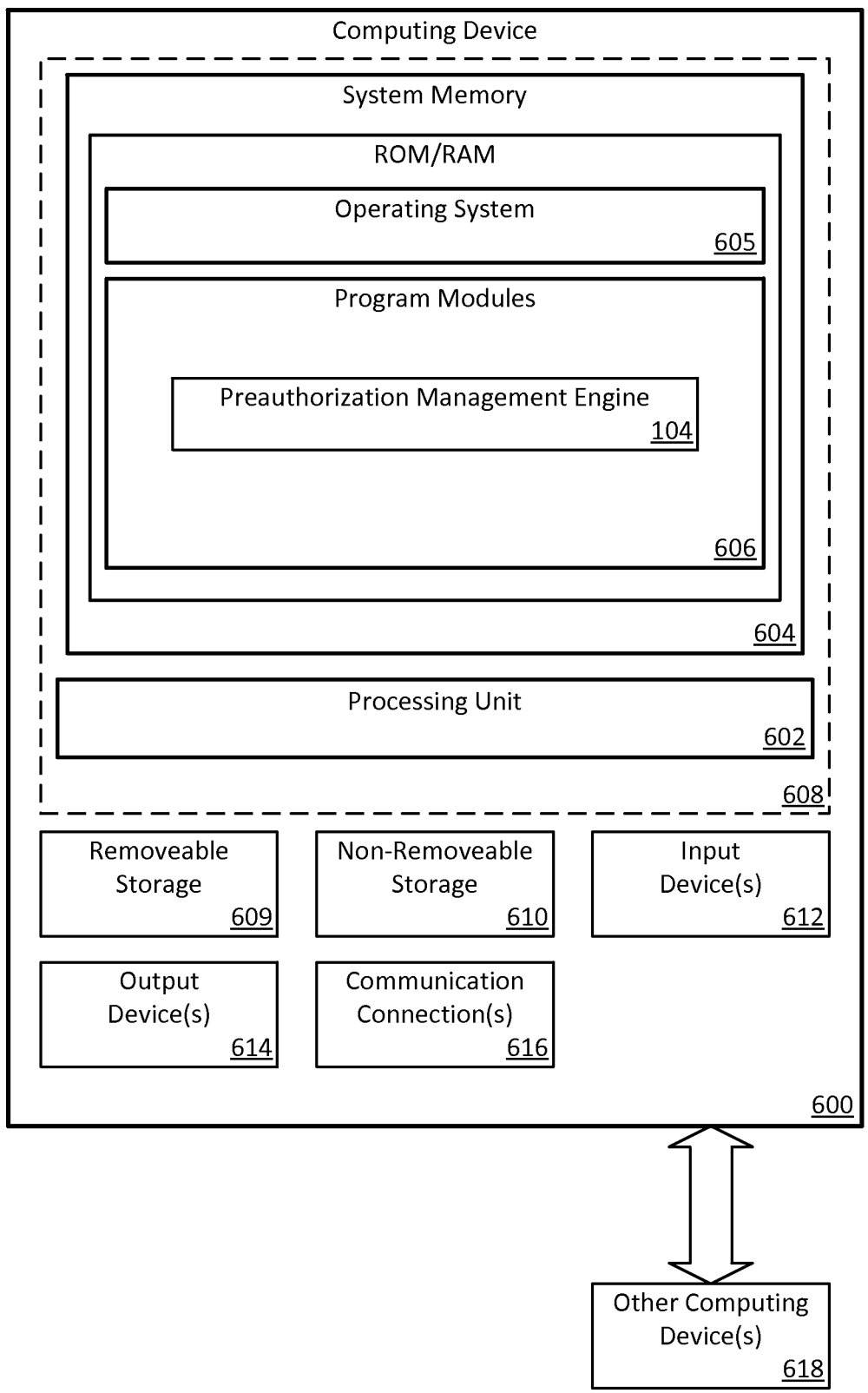
FIG. 6 is a simplified block diagram illustrating example physical components of a computing device with which embodiments of the system may be practiced.

With reference to FIG. 6, a system consistent with embodiments of the invention may include one or more computing devices, such as computing device 600. The computing device 600 may include at least one processing unit 602 and a system memory 604. The system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a preauthorization management engine 104 having sufficient computer-executable instructions, which when executed, performs functionalities as described herein. Operating system 605, for example, may be suitable for controlling the operation of computing device 600. Furthermore, embodiments of the invention may be practiced in conjunction with a graphics library, other operating systems, or any other application program and is not limited to any particular application or system. This basic configuration is illustrated in FIG. 6 by those components within a dashed line 608. Computing device 600 may also include one or more input device(s) 612 (keyboard, mouse, pen, touch input device, etc.) and one or more output device(s) 614 (e.g., display, speakers, a printer, etc.).

Although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data and/or computer-executable instructions readable by a computing device. Computer-readable storage medium do not include communications media.

Further, the stages of the disclosed method may be modified in any manner, including by reordering stages and/or inserting or deleting stages, without departing from the invention.

The computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computing device 600 may also contain a communication connection 616 that may allow device 600 to communicate with other computing devices 618, such as over a network in a distributed computing environment, for example, an intranet or the Internet. Communication connection 616 is one example of communication media.

Program modules, such as the preauthorization management engine 104, may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable user electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system.

Embodiments of the present invention may be utilized in various distributed computing environments where tasks are performed by remote processing devices that are linked through a communications network in a distributed computing environment.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method of managing health care service preauthorization requests to avoid duplicate preauthorization request processing for a health care service for a patient, the computer-implemented method comprising, as implemented by one or more computing devices configured with executable instructions for:

executing an electronic preauthorization status inquiry operation associated with an order from a health care provider system for the health care service comprising a medical procedure requiring preauthorization before the medical procedure is performed, via a preauthorization management system, by:

determining a status inquiry format of a payer system associated with the order requiring preauthorization;

when the status inquiry format of the payer system uses electronic data interchange (EDI) communications for health care transactions:

generating an EDI message associated with an electronic preauthorization status according to the status inquiry format;

sending the EDI message to the payer system; and receiving an EDI response with preauthorization information from the payer system in response to the EDI message;

when the status inquiry format of the payer system uses a web interface for health care transactions:

sending the electronic preauthorization status inquiry as a web form via the web interface to the payer system;

receiving a web page with the preauthorization information from the payer system in response to the web form;

acquiring the preauthorization information from the web page received from the payer system in response to the web form;

acquiring a screen capture of the web page received from the payer system; and associating the screen capture with the order requiring preauthorization;

determining from the preauthorization information received from the payer system in response to the electronic preauthorization status inquiry operation if an electronic preauthorization request associated with authorizing the health care service for the patient has been previously electronically submitted to the payer system from the preauthorization management system;

identifying a preauthorization request status in response to a determination of a previously submitted preauthorization request associated with authorizing the health care service for the patient, wherein the preauthorization management system attempts to locate the preauthorization request status by:

obtaining information about the previously submitted preauthorization request using a prior authorization identifier; and if the preauthorization request status is not determined according to the prior authorization identifier, then obtaining information about the previously submitted preauthorization request according to health information specific to a subscriber or the patient;

sending a preauthorization request to the payer system if the preauthorization information received from the payer system in response to the electronic preauthorization status inquiry operation indicates that there is no previously submitted preauthorization request;

receiving a response from the payer system in response to the preauthorization request;

performing a status update operation to update an authorization record associated with the preauthorization request according to the information in the response from the payer system; and determining whether a final determination has been reached for the preauthorization request or the previously submitted preauthorization request based at least in part on the response from the payer system;

after determination that a final determination has not been reached for the preauthorization request or the previously submitted preauthorization request, automatically establishing a recurring status inquiry for the preauthorization request or the previously submitted preauthorization request, the recurring status inquiry automatically performing periodic status inquiries on an automatically set schedule based at least in part on date of the health care service;

calculating an amount of time before the date of the health care service; and setting the recurring status inquiry at a first time interval frequency when the calculated amount of time before the date of the health care service meets a predetermined threshold, and setting the recurring status inquiry at a second time interval frequency when the calculated amount of time before the date of the health care service does not meet the predetermined threshold, wherein the first time interval frequency is different from the second time interval frequency, and the first time interval frequency is less than the second time interval frequency.

2. The computer-implemented method of claim 1 further comprising executable instructions for grouping the preauthorization requests into work queues using information from the response from the payer system or information manually entered into the preauthorization management system by the user.

3. The computer-implemented method of claim 1 further comprising executable instructions for determining if the payer system accepts automated electronic preauthorization status inquiries.

4. The computer-implemented method of claim 1 further comprising executable instructions for guiding a user through completing a web form for submitting the electronic preauthorization status inquiry or electronic preauthorization request to the payer system.

5. The computer-implemented method of claim 4 further comprising executable instructions for prompting a user to supply missing information needed to complete one or more electronic preauthorization requests.

6. The computer-implemented method of claim 4 further comprising executable instructions for:

logging into the payer system through the preauthorization management system; and displaying the web form from the payer system in a web portal on the preauthorization management system.

7. The computer-implemented method of claim 4 further comprising executable instructions for:

displaying web content received from the payer system in response to the electronic preauthorization status inquiry with supplemental web content provided by the preauthorization management system in a web portal on the preauthorization management system;

capturing an image of the web content from the payer system;

storing the image in the preauthorization management system; and linking the image with the associated preauthorization request.

8. The computer-implemented method of claim 1 further comprising executable instructions for:

preparing the electronic preauthorization request based on the patient and the health care service identified in the order when the response from the payer system indicates that the preauthorization request has not been submitted; and electronically submitting the electronic preauthorization request to the payer system.

9. The computer-implemented method of claim 1 further comprising executable instructions for updating an information system maintained by the health care provider with information received from the payer system in the response to the electronic preauthorization status inquiry.

10. The computer-implemented method of claim 1 further comprising executable instructions for periodically evaluating each pending preauthorization request to determine if a status of each pending preauthorization request can be obtained automatically.

11. The computer-implemented method of claim 10 further comprising executable instructions for automatically checking the status of each pending preauthorization request that can be automatically checked through the payer system.

12. A system for managing health care service preauthorization requests to avoid duplicate preauthorization request processing for a medical service for a patient, the system comprising at least one internal web server having a processor and memory for storing and executing a preauthorization management engine and web service, the system operable to:

execute an electronic preauthorization status inquiry operation associated with an order from a health care provider system for the medical service comprising a medical procedure requiring preauthorization before the medical procedure is performed to:

determine a status inquiry format of a payer system associated with the order requiring preauthorization;

when the status inquiry format of the payer system uses electronic data interchange (EDI) communications for health care transactions:

generate an EDI message associated with an electronic preauthorization status according to the status inquiry format;

send the EDI message to the payer system; and receive an EDI response with preauthorization information from the payer system in response to the EDI message;

when the status inquiry format of the payer system uses a web interface for health care transactions:

send the electronic preauthorization status inquiry as a web form via the web interface to the payer system;

receive a web page with the preauthorization information from the payer system in response to the web form;

acquire the preauthorization information from the web page received from the payer system in response to the web form;

acquire a screen capture of the web page received from the payer system; and associate the screen capture with the order requiring preauthorization;

determine from the preauthorization information received from the payer system in response to the electronic preauthorization status inquiry operation if an electronic preauthorization request for the patient and the medical service has been previously electronically submitted to the payer system;

identify a preauthorization request status in response to a determination of a previously submitted preauthorization request associated with authorizing the health care service for the patient, wherein the preauthorization management system attempts to locate the preauthorization request status by:

obtaining information about the previously submitted preauthorization request using a prior authorization identifier; and if the preauthorization request status is not determined according to the prior authorization identifier, then obtaining information about the previously submitted preauthorization request according to health information specific to a subscriber or the patient;

send a preauthorization request to the payer system if the preauthorization information received from the payer system in response to the electronic preauthorization status inquiry operation indicates that there is no previously submitted preauthorization request;

receive a response from the payer system in response to the preauthorization request;

perform a status update operation to update an authorization record associated with the preauthorization request according to the information in the response from the payer system; and determine whether a final determination has been reached for the preauthorization request or the previously submitted preauthorization request based at least in part on the response from the payer system;

after determination that a final determination has not been reached for the preauthorization request or the previously submitted preauthorization request, automatically establish a recurring status inquiry for the preauthorization request or the previously submitted preauthorization request, the recurring status inquiry automatically performing periodic status inquiries on an automatically set schedule based at least in part on date of the health care service;

calculate an amount of time before the date of the health care service; and set the recurring status inquiry at a first time interval frequency when the calculated amount of time before the date of the health care service meets a predetermined threshold, and set the recurring status inquiry at a second time interval frequency when the calculated amount of time before the date of the health care service does not meet the predetermined threshold, wherein the first time interval frequency is different from the second time interval frequency, and the first time interval frequency is less than the second time interval frequency.

13. The system of claim 12 further comprising a documentation memory storing an image of a web content response from the payer system.

14. The system of claim 13 further comprising a contact information memory storing at least one of an electronic data interchange health care transaction format used by the payer system, an endpoint address for health care transactions at the payer system, and a uniform resource locator for a web interface endpoint at the payer system.

15. The system of claim 14 further comprising a work queue memory for storing a plurality of preauthorization requests grouped into work queues based on at least the status received from the payer system.

16. The system of claim 13 further comprising:
a front end accessed from a user agent on a client device; and
a web interface endpoint operable to receive a web service call from the front end, load the web content from the payer system in a web portal displayable by the user agent, and provide guidance corresponding to the web content from the payer system.

17. A non-transitory computer readable medium comprising computer executable instructions which, when executed, perform a method for managing health care service preauthorization requests to avoid duplicate preauthorization request processing for a health care service for a patient, the method comprising:

executing an electronic preauthorization status inquiry operation associated with an order from a health care provider system for the health care service comprising a medical procedure requiring preauthorization before the medical procedure is performed, via a preauthorization management system, by:

determining a status inquiry format of a payer system associated with the order requiring preauthorization;

when the status inquiry format of the payer system uses electronic data interchange (EDI) communications for health care transactions:
generating an EDI message associated with an electronic preauthorization status according to the status inquiry format;
sending the EDI message to the payer system; and
receiving an EDI response with preauthorization information from the payer system in response to the EDI message;

when the status inquiry format of the payer system uses a web interface for health care transactions:
sending the electronic preauthorization status inquiry as a web form via the web interface to the payer system;
receiving a web page with the preauthorization information from the payer system in response to the web form;
acquiring the preauthorization information from the web page received from the payer system in response to the web form;
acquiring a screen capture of the web page received from the payer system; and
associating the screen capture with the order requiring preauthorization;

determining from the preauthorization information received from the payer system in response to the electronic preauthorization status inquiry operation if an electronic preauthorization request associated with authorizing a health care service has been previously electronically submitted to the payer system from the preauthorization management system;

identifying a preauthorization request status in response to a determination of a previously submitted preauthorization request associated with authorizing the health care service for the patient, wherein the preauthorization management system attempts to locate the preauthorization request status by:

obtaining information about the previously submitted preauthorization request using a prior authorization identifier; and if the preauthorization request status is not determined according to the prior authorization identifier, then obtaining information about the previously submitted preauthorization request according to health information specific to a subscriber or the patient;

sending a preauthorization request to the payer system if the preauthorization information received from the payer system in response to the electronic preauthorization status inquiry operation indicates that there is no previously submitted preauthorization request;

receiving a response from the payer system in response to the preauthorization request;

performing a status update operation to update an authorization record associated with the preauthorization request according to the information in the response from the payer system; and determining whether a final determination has been reached for the preauthorization request or the previously submitted preauthorization request based at least in part on the response from the payer system;

after determination that a final determination has not been reached for the preauthorization request or the previously submitted preauthorization request, automatically establishing a recurring status inquiry for the preauthorization request or the previously submitted preauthorization request, the recurring status inquiry automatically performing periodic status inquiries on an automatically set schedule based at least in part on date of the health care service;

calculating an amount of time before the date of the health care service; and setting the recurring status inquiry at a first time interval frequency when the calculated amount of time before the date of the health care service meets a predetermined threshold, and setting the recurring status inquiry at a second time interval frequency when the calculated amount of time before the date of the health care service does not meet the predetermined threshold, wherein the first time interval frequency is different from the second time interval frequency, and the first time interval frequency is less than the second time interval frequency.

18. The non-transitory computer readable medium of claim 17 comprising the computer executable instructions which, when executed, perform the method, the method further comprising:

storing an image of a web content response from the payer system;

automatically generating a front end interface that electronically communicates with a client device; and receiving a web service call, via a web interface endpoint, from the front end interface, loading the web content from the payer system in a web portal displayable by the user agent, and providing automated electronic guidance corresponding to the web content from the payer system.

19. The non-transitory computer readable medium of claim 17 comprising the computer executable instructions which, when executed, perform the method, the method further comprising:

electronically accessing the payer system through the preauthorization management system; and displaying the web form from the payer system in a web portal on the preauthorization management system.

20. The non-transitory computer readable medium of claim 17 comprising the computer executable instructions which, when executed, perform the method, the method further comprising:

displaying automatically aggregating web content received from the payer system in response to the electronic preauthorization status inquiry with supplemental web content provided by the preauthorization management system to generate aggregated web content;

displaying the aggregated web content in a web portal on the preauthorization management system;

capturing an image of at least a portion of the web content from the payer system;

associating the image with a unique image identifier;

storing the image and the unique image identifier in the preauthorization management system;

automatically generating a link association between the image with the associated preauthorization request using the unique image identifier;

storing the link association in the preauthorization management system.

* * * * *